Jan. 13, 1925
A. G. MARANVILLE
GASKET
Filed Oct. 16, 1919
1,522,962
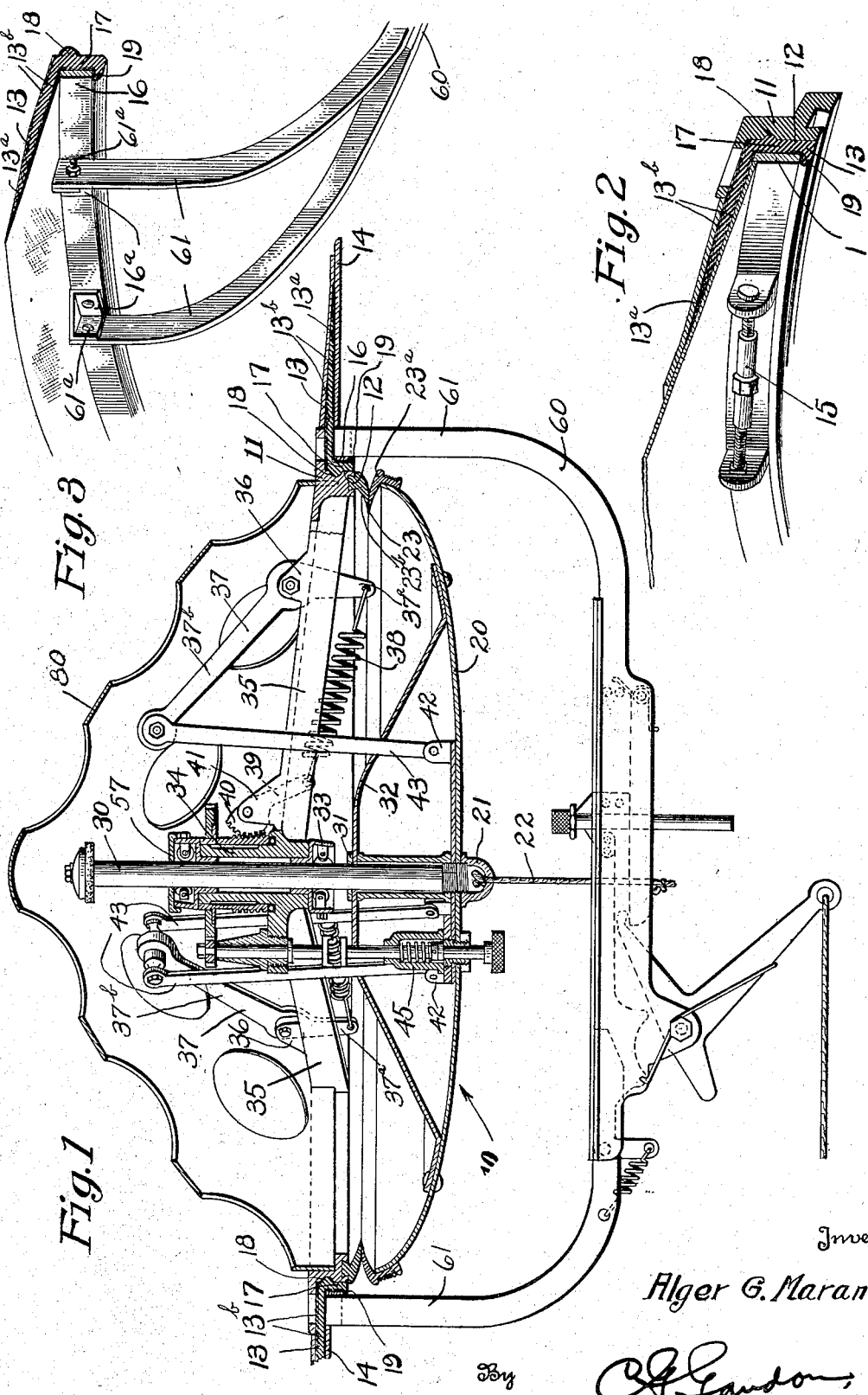
Inventor
Alger G. Maranville
By
his Attorney Patented Jan. 13, 1925.

1,522,962

UNITED STATES PATENT OFFICE.

ALGER G. MARANVILLE, OF AKRON, OHIO, ASSIGNOR TO THE GOODYEAR TIRE & RUBBER COMPANY, OF AKRON, OHIO, A CORPORATION OF OHIO.

GASKET.

Application filed October 16, 1919. Serial No. 331,198.

*To all whom it may concern:*

Be it known that I, ALGER G. MARANVILLE, a citizen of the United States, and resident of Akron, Ohio, have invented new and useful Improvements in Gaskets, of which the following is a specification.

My invention relates to a valve, and has particular reference to a device for securing in place an automatic valve of a type used in balloons, air ballonets and the like.

It is an object of my invention to provide a means for attaching an automatic gas or air valve to the envelope of a balloon, air ballonet, or similar gaseous fluid receptacle provided with a flexible wall, which means will facilitate the removal from or the insertion of the valve into place.

It is a further object of my invention to provide a gasket of such structure that, when attached to the balloon envelope the valve may be readily mounted therewithin and secured thereto without the necessity of manipulating a plurality of nuts or the like.

Other objects and advantages will appear as the description proceeds, and the invention will be more particularly defined in the claims hereto appended.

In the drawings, wherein I have illustrated a preferred form of my invention, used in connection with an automatic valve for balloons:

Figure 1 is a vertical section of an automatic gas valve showing the gasket of my invention in place;

Figure 2 is a perspective view partly in section showing the means for securing the valve in place; and Figure 3 is a perspective view showing the means for attaching the frame carrying the manual operating mechanism.

Referring to Figure 1, the numeral 10 designates, as a whole, an automatic valve such as used on balloons or air ballonets, or the like, for maintaining an equilibrium of pressure difference by compensating for any variations in atmospheric pressure, such variations being caused by change in altitude, temperature and other atmospheric conditions.

This valve 10 comprises a metal annulus 11 nicely fitted into a circular opening 12 formed by a ring shaped gasket 13, preferably of rubber-impregnated fabric, and is secured thereto and within a circular aperture in the envelope 14, by a split band forming a clamping ring or band 16 which encircles the flange 17 on the gasket 13 and binds the gasket to the annulus 11. While a single band 16 has been shown, I have found that two bands may be used with advantage. The split edges of the balloon fabric 14 are secured to the gasket 13 by cementing or otherwise, and the ends of the clamping ring 16 are drawn together by any suitable means, such as a turn buckle 15. The flange 17 has a bead 18 on its inner surface which conforms to and fits within a recess in the annulus, and it has also a bead 19 on its outer surface to prevent the clamping ring or band 16 from slipping off. This gasket 13, tapered toward its outer edge as at 13$^a$ so as to form a better union with the envelope, is reinforced with fabric at 13$^b$ and is especially adapted for setting a gas valve like 10 in an envelope, so that not only is a tight joint secured, but the valve may be readily and quickly inserted in place and removed.

The valve comprises a dome 20, which is concavo-convex in form and is provided at its center with a lug 21 or the like, to which a cord or cable 22 may be fastened by making a knot in the end thereof, as shown, the cable being part of the manual operating mechanism referred to below.

To the outer edge of the dome 20 is secured one section 23$^a$ of the gasket 23, which gasket forms the subject matter of my copending application Ser. No. 331,199, of even date. Cooperating with the part or section 23$^a$ of the gasket is a second part or section 23$^b$ secured to the annulus 11, and adapted to contact with the section 23$^a$, as will be apparent from Fig. 1.

Normally the valve 10 is automatically operated by difference in pressure between that inside the envelope and that of the atmosphere to open the valve for the relief of pressure inside the envelope. The mechanism for effecting this operation consists of the disk-like dome 20, above described, which is exposed to atmospheric pressure on one side, and to that inside the envelope on the other. This dome has secured to the central portion thereof and opposite the lug 21 a stem 30 which is supported or reinforced by any suitable means such as a collar 31 carried by a concaved plate or disc 32 secured to the dome, which gives the device greater rigidity. This stem 30 passes through a central frictionless bearing 33 supported by a hub 34 formed at the meeting point of three spider arms 35 which are radially arranged, being fixed to the inner surface of the annulus 11 at their outer ends, and projecting inwardly to the center hub 34. A pair of ears 36 is formed integral with each spider arm 35 near the outer end thereof, and between the ears of each pair is pivoted a bell-crank lever 37. Helical contractile springs 38 are secured at one end to the shorter ends 37ª of the bell-crank 37, and the other ends of the springs 38 are fastened to arms 39 of toothed sectors 40 pivoted between other ears 41 carried by the spider arms 35 at their inner ends and near the hub 34. The long arm 37ᵇ of each bell-crank 37 is connected to lugs 42 secured to the dome 20, and near the center thereof, by means of links 43. It will thus be seen that the springs 38 tend to move the valve toward closed position by pulling the dome 20 toward the envelope, bringing the lip portions only of the gasket sections 23ª and 23ᵇ into contact to shut off the outflow of gas.

I have also provided mechanism designated as a whole by numeral 45 for suitably adjusting the tension of the springs 38, but this mechanism constitutes no part of the present invention, it being more fully described and claimed in my copending application Ser. No. 331,197, of even date. I have also provided anti-friction rollers or bearings 57 which together with the similar bearing 33 will aid in allowing practically frictionless movement of the stem 30. The operation and advantages of this automatic valve constitute, however, no part of my present invention, but are more particularly referred to and explained in my said copending application, Ser. No. 331,197.

In addition to the mechanism for automatically operating the valve, I have provided a manually operated means which is more fully described and claimed in my copending application Ser. No. 331,200, of even date, of which it forms the chief subject matter. This manual operating mechanism is carried by a yoke 60 spanning the dome and having flaring legs or bifurcations 61, the ends of which are bolted by bolts 61ª, or otherwise suitably secured to lugs 16ª riveted or brazed to the ring 16 and extending radially therefrom; said lugs 16ª being spaced apart peripherally so that the legs 61 span and contact with the outer surfaces thereof. This arrangement makes a rigid support for the yoke 60 and provides, moreover, a means whereby the ring 16 and frame 60 can be removed as a unit, it being only necessary to loosen the turn-buckle 15 when the valve 10 can be withdrawn from the gasket 13. The valve can thus be freely removed without disengaging the ring 16 from the gasket 13, or the frame 60 can be detached from the ring by merely removing the four bolts 61ª without disturbing the valve.

A guard 80 consisting of a conoidal casing, perforated to reduce weight, has been provided to protect the valve mechanism 10, and is secured to the annulus 11 by means of screws so as to enclose the valve 10.

It will thus be understood that I have provided a gasket 13 of such shape that when cemented to the envelope of a balloon or air ballonet and within an aperture in the same, a valve such as 10 may be easily and quickly inserted within the gasket and tightly secured by screwing up the turn-buckle 15. The insertion and removal can be made by the manipulation of merely one screw—the turn-buckle—instead of the necessity of manipulating a multiplicity of wing nuts or bolts as has been previously the practice. In the claims the word balloon is to be construed as a broad term and comprehending the air ballonets usually associated therewith, inasmuch as the valve may be used with either balloon proper or ballonet.

A gasket of the type disclosed may furthermore be readily manufactured by vulcanization thereof in a mold.

While I have disclosed the preferred embodiment of my invention it will be apparent that changes may be made in the form or shape of the gasket such as fall within the scope of the appended claims, without in any sense departing from the essence of my invention.

What I claim is:

1. In combination with the envelope of a balloon, an annular gasket having a bead and secured to said envelope, a valve having an annulus, said annulus being provided with a recess into which said gasket bead fits, and means for binding said gasket to said annulus.

2. In combination with the envelope of a balloon, an annular gasket having a bead on its inner surface and secured to said envelope, a gas valve, an annulus constituting part of said gas valve and provided on its exterior with a recess into which said gasket bead fits, said gasket encompassing said annulus, a split ring for binding said gasket to said annulus and means for drawing together the ends of said split ring.

3. In combination with the envelope of a balloon, an annular gasket having a bead on its inner surface and a bead on its outer surface and secured to said envelope, a gas valve, an annulus constituting part of said gas valve and provided on its exterior with a recess into which said inner gasket bead fits, said gasket encompassing said annulus, a split ring encircling said gasket and held in place by said outer gasket bead, and means for drawing together the ends of said split ring to bind said gasket to said annulus.

4. In combination with the envelope of a balloon, said envelope having an opening therein, a gasket secured to said envelope and within said opening, a valve controlling the flow of fluid through said opening, a ring connecting said gasket to said valve, a yoke spanning said valve, means supported by said yoke for operating said valve, and means carried by said ring for connecting said ring to said yoke.

5. In combination with the envelope of a balloon, said envelope having an opening therein, a gasket secured to said envelope and within said opening, a valve controlling the flow of fluid through said opening, a ring connecting said gasket to said valve, a yoke spanning said valve, means supported by said yoke for operating said valve, and lugs projecting from said ring to which said yoke is connected.

6. A gasket comprising a reinforced main portion in one plane provided with a flange portion substantially at right angles to said plane, the latter portion having beads on its inner and outer surface respectively.

7. An annular gasket of flexible material having a fabric reinforced main portion in one plane and provided with a flange portion substantially at right angles to said plane, the latter portion having beads on its inner and outer surfaces respectively.

8. A gasket comprising a main reinforced portion of uniform thickness provided with a tapered edge, and a portion substantially at right angles to the plane of the main portion said last portion having beads on its outer and inner surfaces respectively.

In witness whereof, I have hereunto signed by name in the presence of two subscribing witnesses.

ALGER G. MARANVILLE.

Witnesses:
J. E. KEATING,
E. C. LEADENHAM.